United States Patent [19]
Stancu et al.

[11] Patent Number: 5,732,994
[45] Date of Patent: Mar. 31, 1998

[54] VEHICLE ADJUSTABLE CONSOLE COVER AND ARMREST

[75] Inventors: Sorin Stancu, Detroit; Gerald A. Heath, Canton; Ionel E. Simplicean, Dearborn Hgts., all of Mich.

[73] Assignee: Ford Global Technologies, Inc., Dearborn, Mich.

[21] Appl. No.: 684,161

[22] Filed: Jul. 19, 1996

[51] Int. Cl.⁶ .................................................. B60R 7/04
[52] U.S. Cl. ..................... 296/37.8; 224/400; 220/331; 297/411.35
[58] Field of Search ................ 296/37.1, 37.8, 296/37.14, 153; 224/275, 400, 282; 220/331; 297/411.32, 411.34, 411.35; 16/326–329

[56] References Cited

U.S. PATENT DOCUMENTS

| | | |
|---|---|---|
| 3,140,119 | 7/1964 | Offner . |
| 3,165,225 | 1/1965 | Reitzel ........................ 220/331 |
| 4,674,798 | 6/1987 | Oeth et al. . |
| 4,934,750 | 6/1990 | Eichler et al. .................. 296/37.8 |

FOREIGN PATENT DOCUMENTS

| | | | |
|---|---|---|---|
| 58-180339 | 10/1983 | Japan ................................. 296/37.8 |
| 3-189249 | 8/1991 | Japan . |
| 3276832 | 12/1991 | Japan . |
| 405338497 | 12/1993 | Japan ............................... 296/37.14 |
| 406099775 | 4/1994 | Japan ............................... 296/37.14 |
| 406107073 | 4/1994 | Japan ............................... 296/37.14 |
| 511435 | 8/1939 | United Kingdom .................. 220/331 |

*Primary Examiner*—Dennis H. Pedder
*Attorney, Agent, or Firm*—David B. Kelley

[57] ABSTRACT

An adjustable cover assembly for a storage bin of a console mounted within a passenger compartment of an automotive vehicle has a hinge assembly for allowing rotatable and transverse movement with respect to the console, a lock pin engagable with the hinge assembly for locking the cover in a releasable lock position, and an indexing mechanism for positioning the cover with respect to the console when the cover is in an adjustment position so that the lock pin is properly engaged. In the releasable lock position, the cover is longitudinally fixed relative to the console, and when in the adjustment position, the cover is unlocked from the console to allow longitudinal adjustment with respect thereto.

15 Claims, 3 Drawing Sheets

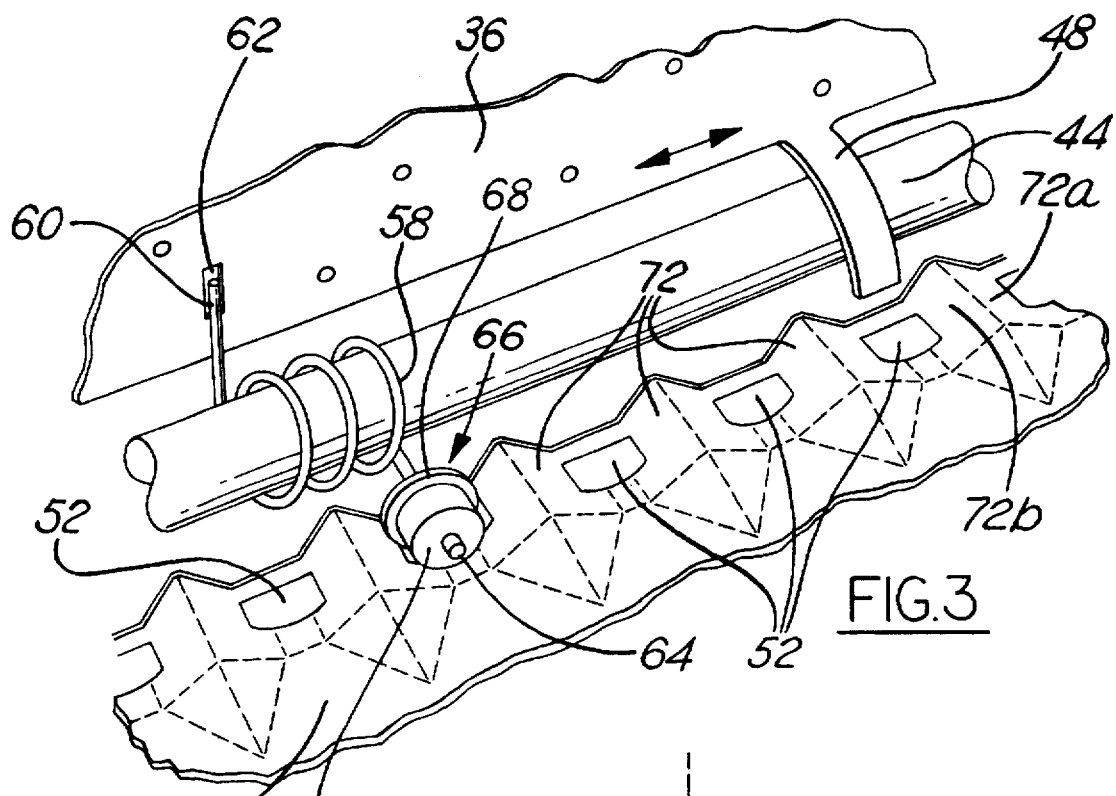
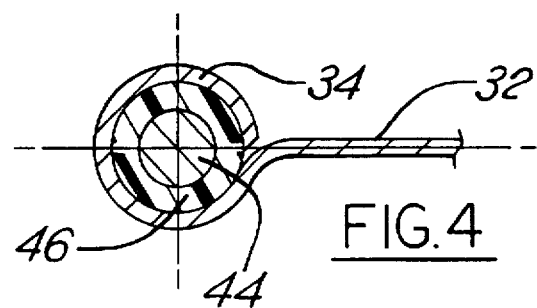
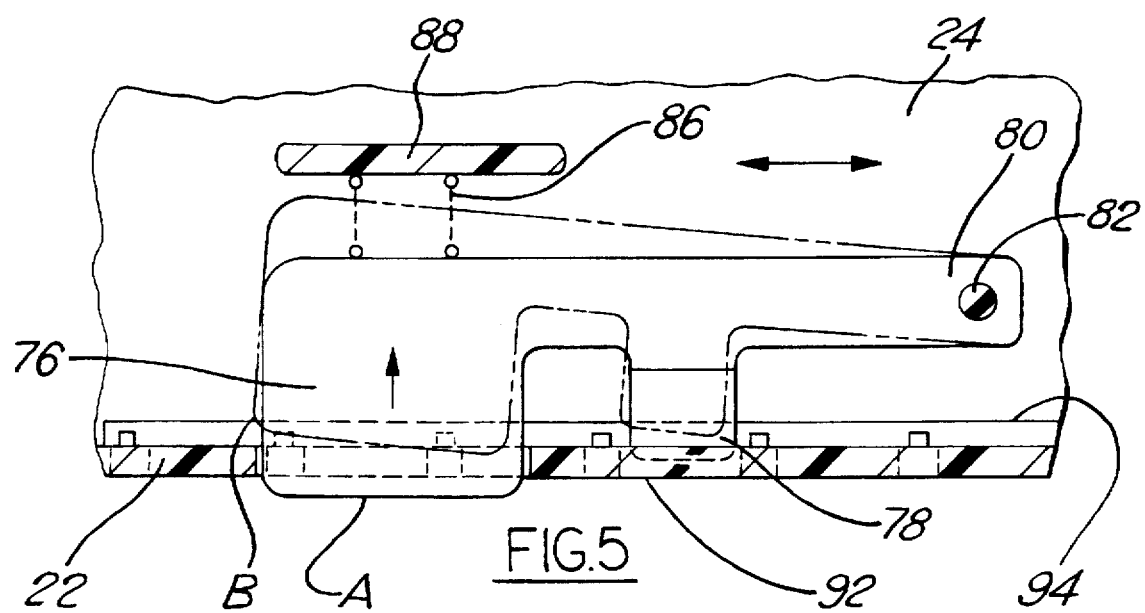

5,732,994

VEHICLE ADJUSTABLE CONSOLE COVER AND ARMREST

FIELD OF THE INVENTION

The present invention relates to automotive vehicle armrests, in general, and more specifically to an adjustable console cover which serves as an armrest.

BACKGROUND OF THE INVENTION

Automotive vehicle passenger compartments often have a console positioned between adjacent seats, for example between bucket seats. The console can house a storage bin for storing various items such as cassette tapes, small tools, maps, and the like. The console typically has a cover over the storage bin which is pivoted along an edge thereof to an open position which allows access to the items stored therein. In addition to providing a cover for the storage bin, a top surface of the cover is often used as an armrest for occupants seated next to the console.

It is known to permit longitudinal displacement of an armrest, between seats or next to a seat, to accommodate different sized occupants and arm sizes. For example, as seen in U.S. Pat. No. 4,674,798 (Oeth et al.), adjustable arm rests are fixed longitudinally by a rotatable latch mechanism 44 which is carried by the arm rests and moved against a support 26 for the arm rests. Offner, in U.S. Pat. No. 3,140,119, illustrates the employment of spring loaded ball 27 to longitudinally fix arm rests 17.

In another mechanism, as seen in U.S. Pat. No. 4,934,750 (Eichler et al.) arm rest 8 is longitudinally slidable on a housing 7 by rollers 17. The housing 7 is mounted on the top of a storage compartment 6 located on a center console 2. The housing and arm rest are pivoted and mounted to the storage compartment 6. The arm rest is longitudinally positioned by lever 23, detent 19, and an apertured rail 18. This mechanism has many parts and is expensive to manufacture and install. In addition, the rails do not provide for rotation of a cover between an open and closed position.

SUMMARY OF THE INVENTION

The present invention overcomes the deficiencies of the related art by providing an adjustable cover assembly for a storage bin of a console mounted longitudinally within a passenger compartment of an automotive vehicle. The cover assembly has hinge means for allowing rotatable and transverse movement with respect to the console, lock means for locking the cover in a releasable lock position, and index means for positioning the cover with respect to the console when the cover is in an adjustment position so that the lock means is properly engaged. In the releasable lock position, the cover is longitudinally fixed relative to the console, and when in the adjustment position, the cover is unlocked from the console for longitudinal movement with respect thereto.

Attached to an inner surface of the storage bin is a storage bin hinge plate with a goose-neck portion raised therefrom along a hinge edge thereof. The goose-neck portion has a pair of longitudinally spaced bin hinge sleeves extending therefrom, and a plurality of lock slots are placed into the hinge edge of the storage bin hinge plate adjacent the cover. The cover has a cover hinge plate attached thereto with at least two cover hinge sleeves longitudinally spaced on opposing ends of the cover hinge plate, a hinge rod fixed to the cover hinge sleeves and mounted through the bin hinge sleeves for slidable movement therethrough, and a lock pin extending from a center portion of the cover hinge plate for interaction with the plurality of lock slots so that the lock pin engages one of the plurality of slots when the cover is in the lock position to prevent longitudinal movement thereof with respect to the storage bin, the lock pin disengaging the one of the plurality of slots when the cover is in the adjustment position to allow longitudinal movement of the cover with respect to the storage bin. Cover index means are also provided for positioning the cover with respect to the storage bin so that the lock pin engages one of the plurality of lock slots when the cover is moved longitudinally with respect to the storage bin.

An advantage of the present invention is a hinge arrangement which allows both rotational and transverse movement of a storage bin cover with respect to a console in an automotive vehicle.

Another advantage is a lock mechanism cooperating with the hinge arrangement to releasably fix the cover with respect to the console.

Still another advantage of the present invention is an indexing mechanism for positioning the cover with respect to the console so that the lock mechanism is properly engaged.

Another advantage is an adjustable cover for a vehicle storage bin in an automotive vehicle which is versatile yet inexpensive to manufacture and easy to install.

A feature of the present invention is a hinge mechanism having a hinge rod attached to a cover hinge plate and mounted to a storage bin hinge plate for longitudinally slidable movement with respect thereto.

Another feature is a locking mechanism having a lock pin extending from a cover hinge plate for interaction with a plurality of lock slots in a storage bin hinge plate to prevent longitudinal movement of the cover.

Yet another feature is a cover indexing means for positioning the cover with respect to the storage bin so that the lock pin engages one of the plurality of lock slots.

BRIEF DESCRIPTION OF THE DRAWINGS

These and other objects, advantages, and features of the present invention will be apparent to those skilled in the vehicle armrest arts upon reading the following description with reference to the accompanying drawings, in which:

FIG. 3 is a close-up perspective view of lock and adjustment means for the cover of FIG. 2;

FIG. 4 is a cross-sectional view taken along line 4—4 of FIG. 2;

FIG. 5 is a cross-sectional view taken along line 5—5 of FIG. 1;

DETAILED DESCRIPTION OF THE PREFERRED EMBODIMENT

Figure 1:
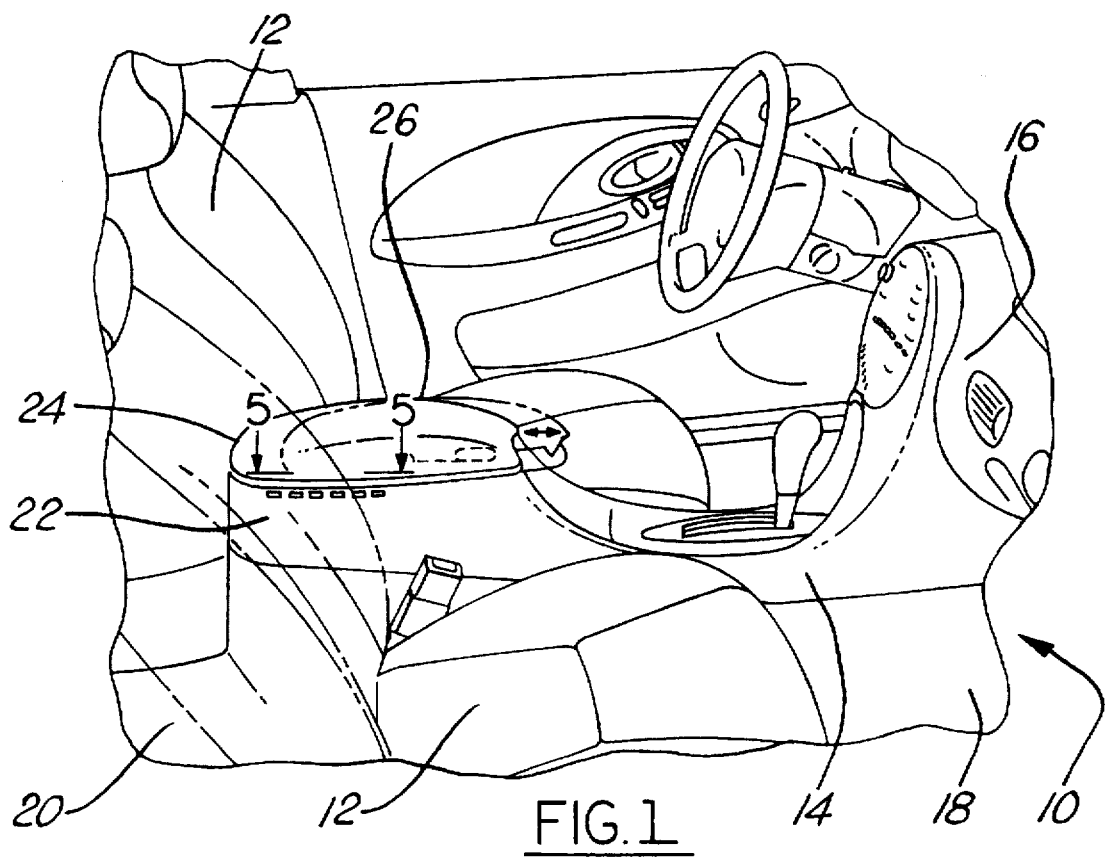
FIG. 1 is a perspective view of an automobile passenger compartment showing a console having a longitudinally adjustable cover according to an embodiment of the present invention.

Turning now to the drawings, and in particular to FIG. 1 thereof, an interior of an automotive vehicle passenger compartment 10 is shown with a pair of bucket seats 12 and a floor mounted console 14 positioned therebetween. As shown in FIG. 1, the console 14 may extend from the instrument panel 16 along the vehicle floor 18 rearwardly to a rear section 20. The console may have a storage bin 22 with a cover 24 mounted thereon (FIGS. 1 and 2) for longitudinal adjustment as further described below. Those skilled in the art will recognize that the console 20 may have a storage area therein between rear seats of the vehicle (not shown). In addition, it will be recognized that the cover 24 need not be attached to a storage bin but may act as an adjustable arm rest movable with respect to the console 20.

Figure 2:
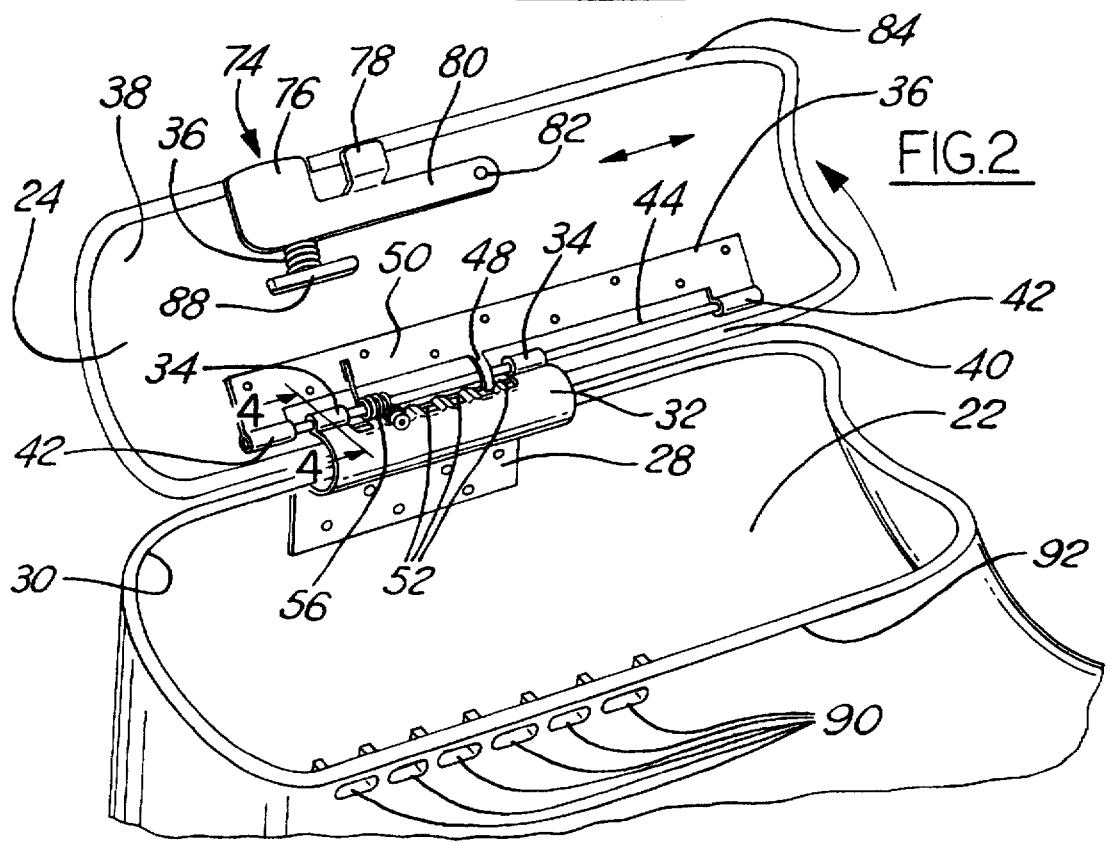
FIG. 2 is a perspective view of a longitudinally adjustable cover in an adjustment position.

Referring now to FIG. 2, it is seen that the cover 20 is movable to an open position away from the storage bin 22 to allow access thereto. In the open position, the cover 24 is adjustable in forward and rearward longitudinal directions to accommodate the position of an occupant adjacent thereto. In a closed position (FIG. 1) an upper surface 26 of the cover 24 may be used as an armrest.

In a preferred embodiment of the present invention, fore and aft adjustability is achieved by mounting the cover 24 to a bin hinge plate 28 so as to be slidable relative to the storage bin 22. The bin hinge plate 28 is mounted to an inner surface 30 of the storage bin 22. The bin hinge plate 28 has a gooseneck 32 with a pair of sleeves 34. A cover hinge 36 is mounted to an under surface 38 of the cover 24 along an edge 40 thereof proximate the bin hinge plate 28 (FIG. 2). The cover hinge 36 has a pair of sleeves 42 on longitudinal ends thereof for fixedly receiving a hinge rod 44. The hinge rod 44 is received in sleeves 34 of the bin hinge plate 28 for both rotatable and longitudinally, transverse slidable movement therethrough. To facilitate these movements and reduce noise, a bushing 46 may be placed between the sleeve 34 and the hinge rod 44 (FIG. 4). Such a bushing may also be place between the sleeves 42 of the cover hinge 36 and the hinge rod 44. The bushings are preferably made of plastic.

The cover hinge plate 36 has an arcuate shaped lock pin 48 extending from a center section 50 thereof in the direction of the cover edge 40. The lock pin 48 engages with one of a series of slots 52 along a hinge rod adjacent edge 54 of the gooseneck 32, as best seen in FIG. 3. The lock pin 48 may be welded to or stamped from the cover hinge 36. As the cover 24 is moved from the open position (FIG. 2) to the closed position (FIG. 1), the lock pin 48 enters one of the slots 52, thus preventing longitudinal movement of the cover 24 with respect to the console 22. In order to readjust the longitudinal position of the cover 24 to provide an adjusted armrest position, the cover 24 is rotated to the open position (FIG. 2) so that the lock pin 48 disengages from the slot 52. The cover 24 can then be adjusted forward or rearward, as required, and the cover 24 is then returned to the closed position so that the lock pin 48 engages a new slot 52.

To facilitate location of the lock pin 48 with respect to the slots 52, an indexing mechanism 56 is mounted between the first bin hinge plate 28 and a cover hinge 36 (FIGS. 2 and 3). As best seen in FIG. 3, the indexing mechanism 56 comprises a coil spring 58 wrapped around the hinge rod 44 with a first end 60 attached in a slot 62 in the cover hinge 36 and a second end 64 fixed to a guide wheel 66. The guide wheel 66 preferably has a disc portion 68 and a generally cylindrical drum portion 70. The tension in the spring 58 is so arranged such that when the guide wheel 66 is situated within a slot 52, the lock pin 48 is aligned so as to easily engage a different slot 52 when the cover 24 is moved to the closed position. When the cover 24 is moved to the open position, and slid longitudinally along the hinge rod 44, the spring 58 is compressed until the force exerted thereby overcomes the rolling force of the disc portion 68 within the slot 52, thus allowing the guide wheel 66 to disengage from the slot 52 and roll onto a tab 72 separating adjacent slots 52. To allow good alignment of the guide wheel 66, the drum 70 remains in contact with the edge 54 of the gooseneck 32 when the disc portion 68 is in a slot 52. Preferably, the tabs 72 are raised in an inverse V-shape, roof-type fashion to provide inclined surfaces 72a and 72b upon either side thereof. The indexing mechanism thus operates in an over-the-center fashion to ensure that the lock pin 48 will engage a slot 52.

A push-to-open button 74 can be used in conjunction with the lock pin 48 to lock the cover 24 with respect to the console 22 (FIG. 2). The button 74 has a push tab 76 and a lock tab 78 extending from an arm 80 which is pivotally attached to the cover 24 with a pivot pin 82. The push tab 76 is biased so as to extend outward of a cover edge 84 by a spring 86 attached on one end to a stop 88 and on the other end to the push tab 76 (FIGS. 2 and 5). When the push tab 76 is an undepressed position A (FIG. 5), the lock tab 78 engages one of a series of holes 90 along an upper lateral edge 92 of the console 22 (FIGS. 2 and 5). The cover 24 is thus fixed in the closed position. When the push tab 76 is in a depressed position B (FIG. 5), the lock tab 78 is disengaged from a hole 90, thus allowing it to rotate to the open position.

Figure 6:
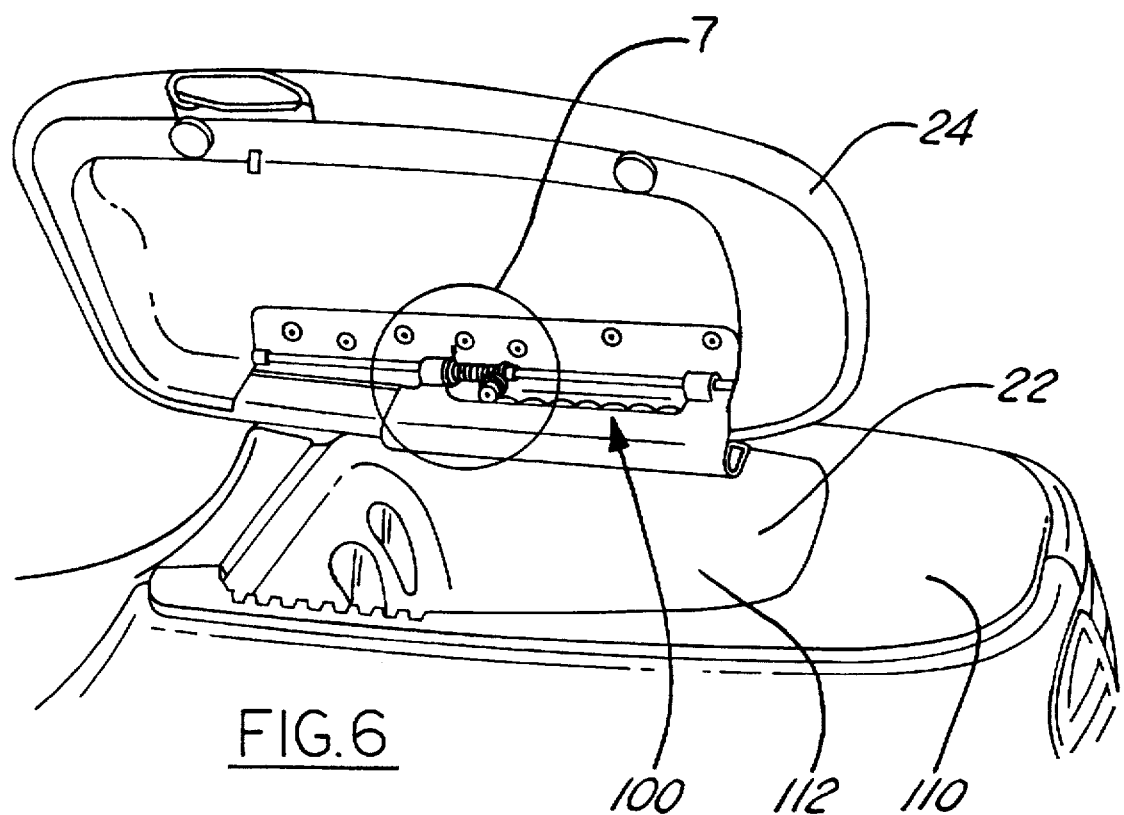
FIG. 6 is a perspective view of an alternative embodiment of an adjustable cover according to the present invention.
Figure 7:
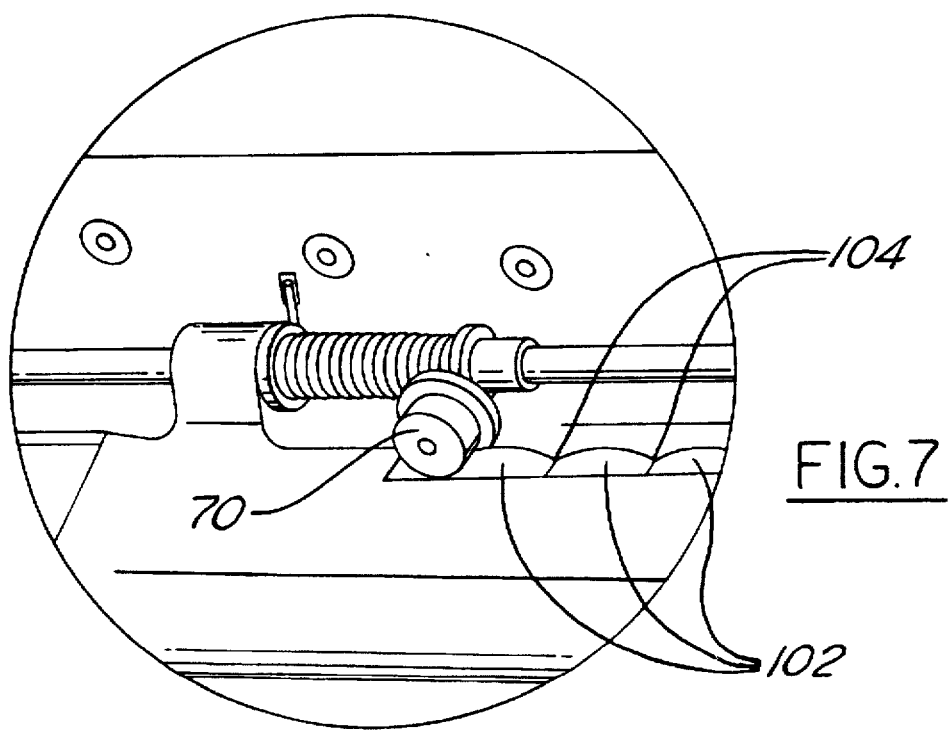
FIG. 7 is a close-up perspective view of an alternative index mechanism for the adjustable cover of FIG. 6.

In an alternative embodiment, the push-to-open button 74 can be used to lock the cover 24 in both the rotational and longitudinal directions. When the push tab 76 is pushed inwardly a predetermined distance, the lock tab 78 disengages from a hole 90 to allow longitudinal movement of the cover 24, for example to adjust the cover to provide a more convenient armrest location. Rotational movement of the cover 24 is prevented by the lock tab 78 engaging a lip 94 (FIG. 5) on an interior of the storage bin 22 proximate the edge 92. If access is desired to the storage bin 22, the push tab 76 is pressed further inwardly until the lock tab 78 disengages from the lip 94. The cover can then be rotated about the hinge rod 44 to the open position (FIG. 2). No longer required are a lock pin on the cover hinge plate 36 or a slots 52 in the bin hinge plate 28. Indexing of the cover 24 with respect to the storage bin 22 so that the push tab 76 and the lock tab 78 align with holes 90 is preferably accomplished by an indexing mechanism similar to that previously described. As seen in FIGS. 6 and 7, however, the cover 24 has an undulation section 100 comprised of a series of adjacent arcuate bumps 102 defining valleys 104 therebetween in which the drum portion 70 of the guide wheel 66 rests so as to properly align the lock tab 78 with the holes 90.

The hinge rod 44 can be mounted horizontally on the cover 24, or alternately can be angled with respect to the vehicle floor 18, that is angled horizontally, so that when the cover 24 slides forward, the cover will be raised to accommodate a shorter occupant. The coil spring 58 additionally acts to bias the cover 24 to the open position. Those skilled in the an will recognize that the hinge rod 44 can be mounted on either side of the storage bin 22 so that the cover 24 opens toward or away from the vehicle driver. The push-to-open button 74 would preferably be positioned a side opposite from the hinge rod 44, but could also be located on the front edge of cover 24.

As seen in FIG. 6, the storage bin 22 preferably has a rear bin cover 110 for covering a portion of the opening 112 when the cover 24 is adjusted forward (which is to the left in FIG. 6). Adjustment of the cover 24 will thus not expose the contents of the storage bin 22. The rear bin cover 110 is preferably fixed over the opening 112, but could be forwardly slidable to allow access to storage bin 22.

Although the preferred embodiment of the present invention has been disclosed, various changes and modifications may be made without departing from the scope of the invention as set forth in the appended claims.

We claim:

1. An adjustable cover assembly for a storage bin of a console mounted longitudinally within a passenger compartment of an automotive vehicle, the cover assembly comprising:
   (a) a cover hingedly attached to the storage bin and having a releasable lock position in which the cover is longitudinally fixed relative to the storage bin and an adjustment position in which the cover is unlocked from the storage bin for longitudinal movement with respect thereto;
   (b) a storage bin hinge plate attached to an inner surface of the storage bin, having:
      (i) a goose-neck portion raised from the inner surface of the storage bin along a hinge edge thereof;
      (ii) at least two longitudinally spaced bin hinge sleeves extending from the goose-neck portion; and
      (iii) a plurality of lock slots in an edge of the storage bin hinge plate adjacent the cover;
   (c) a cover hinge plate attached to the cover and having:
      (i) at least two cover hinge sleeves longitudinally spaced on opposing ends of the cover hinge plate;
      (ii) a hinge rod fixed to the cover hinge sleeves and mounted through the bin hinge sleeves for slidable movement therethrough; and
      (iii) a lock pin extending from a center portion of the cover hinge plate for interaction with the plurality of lock slots so that the lock pin engages one of the plurality of slots when the cover is in the lock position to prevent longitudinal movement thereof with respect to the storage bin, the lock pin disengaging the one of the plurality of slots when the cover is in the adjustment position to allow longitudinal movement of the cover with respect to the storage bin; and
   (d) cover index means for positioning the cover with respect to the storage bin so that the lock pin engages one of the plurality of lock slots when the cover is moved longitudinally with respect to the storage bin.

2. A cover assembly according to claim 1 wherein the cover has cover lock means thereon for locking the cover in a closed position to prevent rotatable motion of the cover with respect to the storage bin, the lock means having an open position in which the cover is rotatable about the hinge rod with respect to the storage bin to allow access thereto.

3. A cover assembly according to claim 2 wherein the cover lock means comprises:
   a lock arm pivotally mounted to an inner surface of the cover;
   a push tab, extending from the lock arm, biased outward of a cover edge in a released position and pushable inward of the cover edge in a pushed position; and
   a lock tab, extending from the lock arm, for engaging one of a plurality of openings in a bin edge of the storage bin when the push tab is in the released position, the lock tab disengaging from the one of the plurality of openings when the push tab is in the pushed position.

4. A cover assembly according to claim 3 wherein the push tab is biased outward of the cover edge by a lock spring mounted between the lock arm and a stop mounted to the inner surface of the cover.

5. A cover assembly according to claim 1 wherein the cover index means comprises slot location means for locating the cover relative to the plurality of slots and slot location movement means for moving the slot location means in predetermined increments.

6. A cover assembly according to claim 5 wherein the slot location means comprises a guide wheel movable between the plurality of slots and the slot location movement means comprises a coil spring coiled around the hinge rod with a first end attached to the cover hinge plate and a second end mounted in a center of the guide wheel such that an axis thereof is generally perpendicular to the hinge rod.

7. A cover assembly according to claim 1 wherein a plastic bushing is placed between the hinge rod and each of the pair of the bin hinge sleeves.

8. A cover assembly according to claim 1 wherein the cover has a push button thereon cooperative with the storage bin to lock the cover in a closed position rotationally fixed relative to the console and an open position in which the cover is unlocked from the console for rotational movement with respect thereto.

9. An adjustable armrest assembly for a console mounted longitudinally within a passenger compartment of an automotive vehicle, the armrest assembly comprising:
   (a) an armrest hingedly attached to the console and having a lock position longitudinally fixed relative to the console and an adjustment position in which the armrest is unlocked from the console for longitudinal movement with respect thereto;
   (b) hinge means for allowing rotatable and longitudinal movement of the armrest with respect to the console;
   (c) lock means for locking the armrest in the lock position; and
   (d) index means for positioning the armrest with respect to the console when the armrest is in the adjustment position so that the lock means is properly engaged.

10. An armrest assembly according to claim 9 wherein the hinge means comprises:
   (a) a console hinge plate attached to an upper surface thereof, having:
      (i) a goose-neck portion raised from the upper surface of the console along a hinge edge thereof; and
      (ii) a pair of longitudinally spaced console hinge sleeves extending from the goose-neck portion; and
   (b) an armrest hinge plate attached to the armrest and having:
      (i) a pair of armrest hinge sleeves longitudinally spaced on opposing ends of the armrest hinge plate; and
      (ii) a hinge rod fixed to the armrest hinge sleeves and mounted through the console hinge sleeves for slidable movement therethrough.

11. An armrest assembly according to claim 10 wherein the lock means comprises:
   a plurality of lock slots in an edge of the console hinge plate adjacent the armrest; and
   a lock pin extending from a center portion of the armrest hinge plate for interaction with the plurality of lock slots so that the lock pin engages one of the plurality of slots when the armrest is in the lock position to prevent longitudinal movement thereof with respect to the console, the lock pin disengaging the one of the plurality of slots when the armrest is in the adjustment position to allow longitudinal movement with respect to the console.

12. An armrest assembly according to claim 11 wherein the index means comprises slot location means for locating the armrest relative to the plurality of slots and slot location movement means for moving the slot location means in predetermined increments.

13. An armrest assembly according to claim 12 wherein the slot location means comprises a guide wheel movable between the plurality of slots and the slot location movement means comprises a coil spring coiled around the hinge rod with a first end attached to the cover hinge plate and a second end mounted in a center of the guide wheel such that an axis thereof is generally perpendicular to the hinge rod.

14. An armrest assembly according to claim 13 wherein a plurality of inverse V-shaped tabs separate the plurality of lock slots to facilitate engagement of the lock pin with a lock slot.

15. An adjustable cover assembly for a storage bin of a console mounted within a passenger compartment of an automotive vehicle, the cover assembly comprising:

(a) a cover hingedly attached to the storage bin and having a releasable lock position in which the cover is longitudinally fixed relative to the storage bin and an adjustment position in which the cover is unlocked from the storage bin for longitudinal movement with respect thereto;

(b) a storage bin hinge plate attached to an inner surface of the storage bin and having a plurality of lock slots in an edge of the storage bin hinge plate adjacent the cover; and (c) a cover hinge plate attached to the cover and having:
      (i) a hinge rod fixed thereto and mounted to the storage bin hinge plate for longitudinally slidable movement with respect to the storage bin; and
      (ii) a lock pin extending from a center portion of the cover hinge plate for interaction with the plurality of lock slots so that the lock pin engages one of the plurality of slots when the cover is in the lock position to prevent longitudinal movement thereof, the lock pin disengaging the one of the plurality of slots when the cover is in the adjustment position to allow longitudinal movement of the cover with respect to the storage bin.

* * * * *